May 7, 1929.

D. E. STALCUP 1,711,909

PROJECTING APPARATUS

Filed Sept. 15, 1926    2 Sheets-Sheet 1

Inventor
DOYLE E. STALCUP

By

Attorney

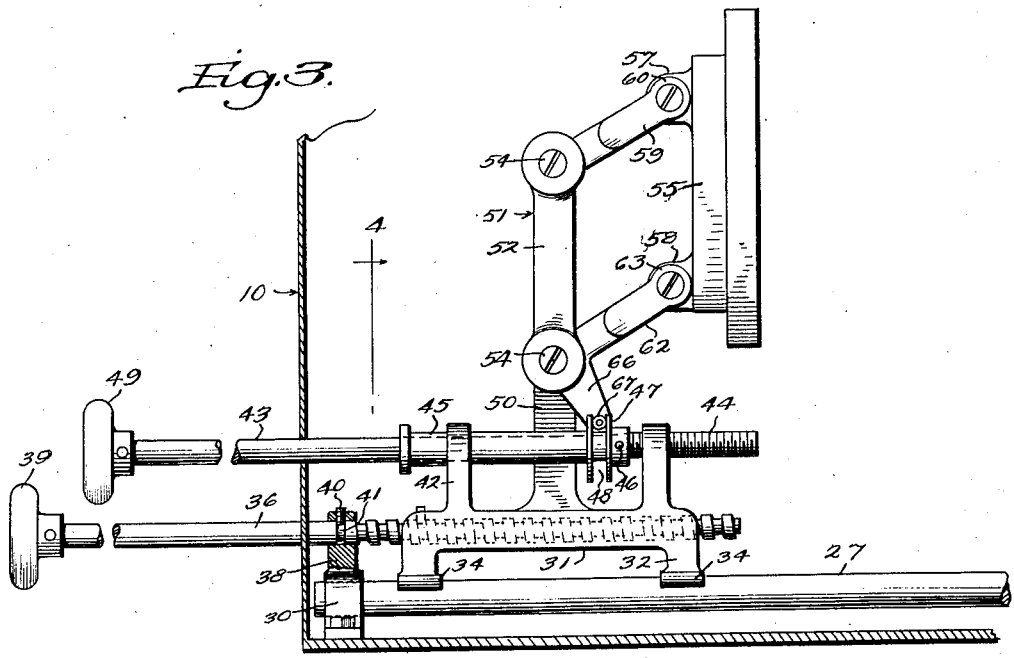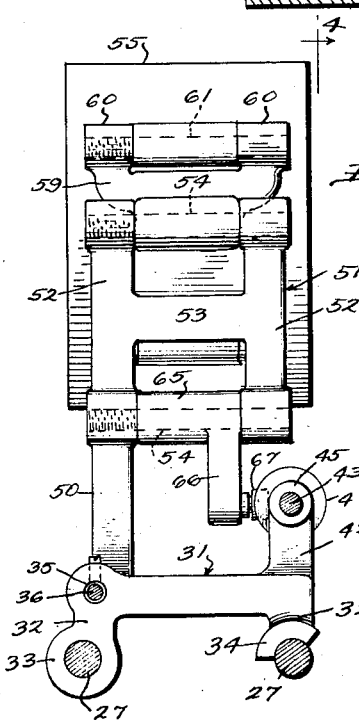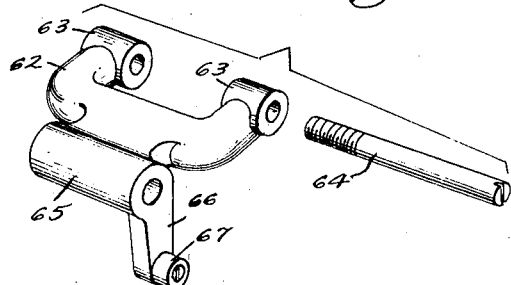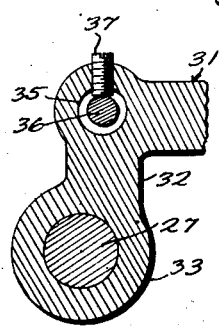

Patented May 7, 1929.

1,711,909

UNITED STATES PATENT OFFICE.

DOYLE E. STALCUP, OF OKMULGEE, OKLAHOMA.

PROJECTING APPARATUS.

Application filed September 15, 1926. Serial No. 135,607.

This invention relates to projecting apparataus and more particularly to apparatus for projecting pictures for advertising purposes, etc.

An important object of the invention is to provide a projecting apparatus having a source of light, a projecting lens, and means for supporting a positive picture at the inner focus of the lens whereby an image of the picture may be projected upon a suitable screen or the like.

A further object is to provide a device of the above mentioned character provided with an angularly arranged mirror placed outwardly of the lens for transverting the image.

A further object is to provide novel means for supporting the picture to be projected.

A further object is to provide means for supporting the picture whereby it may be moved toward and away from the lens and adjusted vertically as desired.

Other objects and advantages of the invention will become apparent during the course of the following description.

In the drawings I have shown one embodiment of the invention. In this showing:

Figure 3 is a fragmentary sectional view of the lower rear portion of the projecting apparatus, parts being shown in elevation, Figure 4 is a detail section on line 4—4 of Figure 3, parts being omitted, Figure 5 is a detail perspective view of one of the frame adjusting members, and, Figure 6 is a detail section on line 6—6 of Figure 2.

Figure 1:
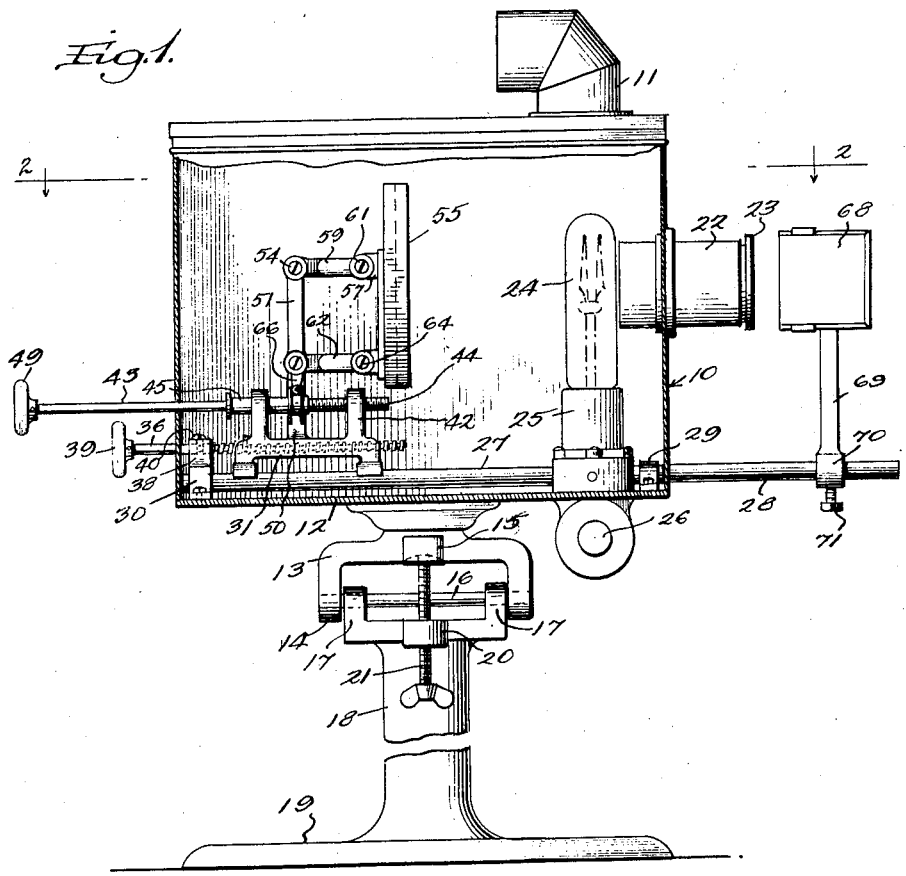
Figure 1 is a side elevation of the device, parts being broken away.
Figure 2:
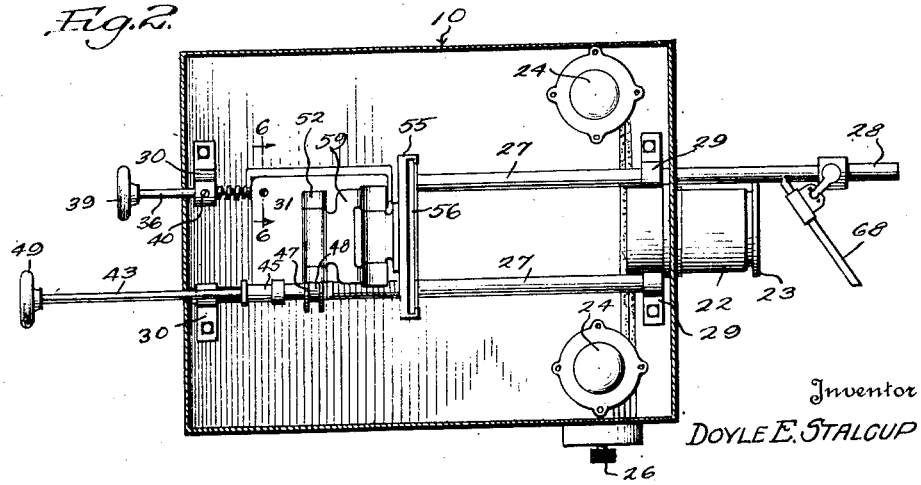
Figure 2 is a horizontal sectional view on line 2—2 of Figure 1.

Referring to the drawings the numeral 10 designates a suitable housing having a stack 11 provided for ventilating purposes, as will be apparent. The bottom wall 12 of the casing is mounted upon a bracket 13 having a pair of depending arms 14 and a pair of horizontally extending arms 15. A pivot pin 16 extends through the arms 14 and is pivotally supported by a pair of upstanding arms 17 carried by a support 18 arranged on a base 19. The support is also provided with a pair of horizontally extending arms 20 in which vertical screws 21 are threaded. The upper ends of these screws engage the arms 15 whereby the device may be transversely adjusted.

The front wall of the casing is provided with a lens holder 22 in which are arranged ordinary projecting lenses (not shown), the focus of which is adapted to be adjusted by an adjustment member 23. The lenses and the holder therefor form no part of the present invention and need not be described in detail.

Illumination for the picture is provided by a pair of suitable lamps 24 arranged in sockets 25. Current may be supplied to the lamps from any suitable source and the current is controlled by a switch 26.

A pair of horizontal rods 27 are arranged in the lower portion of the casing and extend longitudinally thereof. One of these rods extends through the forward wall of the casing and a substantial distance therebeyond as indicated at 28, for a purpose to be described. The rods are supported in the forward end of the casing by suitable brackets 29, and in the rear end of the housing by brackets 30.

A carriage 31 is mounted to reciprocate on the rods 27. This carriage is provided with a plurality of depending legs 32, two of which have bearings 33 at their lower ends encircling one of the rods 27, while the other legs 32 are provided at their lower ends with bearings 34 adapted to slide on the other rod 27. The carriage 31 is provided adjacent one side with an opening 35 extending longitudinally thereof to receive a threaded rod 36. A set screw 37 extends into the opening 35 and engages the threads of the rod 36. One of the rear brackets 30 is provided with a vertical extension 38 forming a bearing for the rod 36, the latter extending through the rear wall of the casing and being provided at its rear end with an operating knob 39. As shown in Figure 3, a set screw 40 extends into the bearing 38 and the inner end of this set screw engages in a circular groove 41 formed in the rod 36 rearwardly of the threads thereof.

The opposite side of the carriage is provided with a pair of upstanding arms 42 as clearly shown in Figures 3 and 4. A rod 43 extends through these arms and is threaded at its forward end as at 44. The threaded portion of the rod 44 engages in a threaded opening formed in the forward arm 42 for a purpose to be described. A sleeve 45 is secured to the rod 43 by a set screw or the like 46 whereby the sleeve is adapted to rotate with the rod. This sleeve is provided with a pair of flanges 47 forming a groove 48 for a purpose to be described. The rear end of the rod 43 extends through and beyond the rear wall of the casing and is provided at its extremity with an operating knob 49.

Opposite the upstanding arms 42 the carriage is further provided with a vertically extending arm 50 and this arm carries a substantially H-shaped frame support 51 at its upper end, this support including parallel side arms 52 and a cross member 53. Pivot pins 54 extend through the upper and lower ends of the side members 54 for a purpose to be described.

Referring to Figures 3 and 4, the numeral 55 designates a supporting frame which may be provided in its forward face with a slot 56 adapted to receive pictures or the like to be projected. The rear face of the frame is provided with upper and lower ears 57 and 58 respectively.

A link 59 connects the ear 57 to the upper pivot pin 54. This link is provided at its forward end with arms 60, and a pivot pin 61 passes through these arms and through the ear 57. It will be apparent that the rear end of the link 59 is arranged between the upper ends of the arms 52 and pivotally supported by the upper pivot pin 54. A bell crank lever 62 connects the lower end of the frame to the lower end of the standard 51. The bell crank lever is provided with arms 63 receiving a pivot pin 64 which also extends through the ear 58. The bell crank lever is provided with a bearing 65 to pivotally receive the lower pivot pin 54. A depending arm 66 is carried by the bearing 50 and is provided at its lower end with a roller 67 arranged in the groove 48.

A transverting mirror 68 is arranged forwardly of the lenses and substantially at an angle of 45° with respect to the axis of the lenses. The mirror is supported by a standard 69 having a bearing 70 at its lower end slidably mounted upon the projecting rod end 28. The set screw 71 is provided for holding the mirror in selected positions.

The operation of the device is as follows:

A picture or the like to be projected is arranged in the slot 56 and the lights 24 are turned on. The knob 39 is rotated to secure the proper longitudinal position of the picture in the rearward focus of the lenses. It will be apparent that the rod 36 is fixed against longitudinal movement by the set screw 40. As the rod is rotated, the pin 37, engaging the threads of the rod 36, causes the carriage to be moved longitudinally. It will be obvious that the rearward focus of the lenses may be adjusted by moving the member 23 in the usual manner whereby a projected image of desired size may be obtained. Vertical adjustment of the frame is accomplished by rotating the rod 43. It will be apparent that the threaded connection between this rod and the forward arm 42 causes the rod to move longitudinally as it is turned. Since the sleeve 45 is secured to the rod 43 it will be obvious that the rod moves with the sleeve and this movement is transmitted to the bell crank lever 62 by virtue of the engagement of the roller 67 in the groove 48. Movement of the bell crank lever obviously is adapted to swing the frame upwardly or downwardly, and the frame maintains a vertical position due to the fact that the axes of the pivot pins 54, 61 and 64 define a parallelogram. The use of the mirror 68 transverts the image as will be apparent.

The device is adapted to be used for any desired purpose such as projecting pictures for amusement or advertising purposes. It also will be apparent that the device may be used as an aid in sketching and particularly for making enlarged sketches of pictures, by projecting the image of a small picture upon a sheet of drawing paper and sketching the image as projected.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a projecting apparatus, a picture holder, a source of light for illuminating the picture, lenses for projecting an image of the picture, means for moving said holder toward and away from the lenses, a support for said holder, a pair of parallel members pivotally connected at opposite ends to said holder and said support, the pivot points of said members defining a parallelogram, and means for swinging said members about their pivots.

2. In a projecting apparatus, a picture holder, a source of light for illuminating the picture, lenses for projecting an image of the picture, means for moving said holder toward and away from the lenses, a support for said holder, a pair of parallel members pivotally connected at opposite ends to said holder and said support, the pivot points of said members defining a parallelogram, an arm carried by one of said members at an angle thereto and projecting outwardly from its pivotal connection with said support, and means for moving said arm.

3. In a projecting apparatus, a picture holder, a source of light for illuminating the picture, lenses for projecting an image of the picture, means for moving said holder toward and away from the lenses, a support for said holder, a pair of parallel members pivotally connected at opposite ends to said holder and said support, the pivot points of said members defining a parallelogram, an arm carried by one of said members at an angle thereto and projecting outwardly from its pivotal connection with said support, a longitudinally movable shaft, and connections between said shaft and said arm for swinging the latter.

4. In a projecting apparatus, a picture holder, a source of light for illuminating the picture, lenses for projecting an image of the picture, means for moving said holder toward and away from the lenses, a support for said holder, a pair of parallel members pivotally connected at opposite ends to said holder and said support, the pivot points of said members defining a parallelogram, an arm carried by one of said members at an angle thereto and projecting outwardly from its pivotal connection with said support, a roller carried by the end of said arm, and a longitudinally movable shaft provided with an annular groove receiving said roller.

5. In a projecting apparatus, a casing, a pair of bearing rods arranged in the lower portion of said casing, a carriage slidable on said rods, a support carried by said carriage, a pair of members arranged parallel to each other and each pivotally connected at one end to said support, a picture holder pivotally connected to the opposite ends of said members, means for operating said members, a source of illumination for the picture, lenses for projecting an image of the picture, and means for moving said carriage along said rods toward and away from the lenses, In testimony whereof I affix my signature.

DOYLE E. STALCUP.